US010117097B1

(12) United States Patent
Kotara et al.

(10) Patent No.: US 10,117,097 B1
(45) Date of Patent: Oct. 30, 2018

(54) SHORT-RANGE CROSS-DEVICE AUTHORIZATION

(71) Applicant: United Services Automobile Association (USAA), San Antonio, TX (US)

(72) Inventors: Brandon Scott Kotara, Farmers Branch, TX (US); Cale Riley Spratt, Carrollton, TX (US); Adrian Borunda, Celina, TX (US); Jeffrey Joseph Szcinski, Carrollton, TX (US); Richard Tanner, McKinney, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/450,572

(22) Filed: Mar. 6, 2017

(51) Int. Cl.
*H04W 12/06* (2009.01)
*H04L 29/08* (2006.01)
*H04W 12/04* (2009.01)

(52) U.S. Cl.
CPC ............. *H04W 12/06* (2013.01); *H04L 67/12* (2013.01); *H04L 67/303* (2013.01); *H04W 12/04* (2013.01)

(58) Field of Classification Search
CPC ...... H04W 12/06; H04W 12/04; H04L 67/12; H04L 67/303
See application file for complete search history.

(56) References Cited

U.S. PATENT DOCUMENTS

| 2005/0177515 A1* | 8/2005 | Kalavade | H04L 63/0892 705/52 |
| 2011/0209208 A1* | 8/2011 | Quach | H04L 9/3215 726/7 |
| 2013/0167208 A1* | 6/2013 | Shi | H04L 63/18 726/5 |
| 2013/0219479 A1* | 8/2013 | DeSoto | H04W 12/06 726/6 |

(Continued)

OTHER PUBLICATIONS

'tomsguide.com' [online]. "How to Set Up Google Chromecast," Jul. 2013, [retrieved on Mar. 6, 2017]. Retrieved from the Internet: URL<http://www.tomsguide.com/us/chromecast-how-to,review-1811.html>. 13 pages.

*Primary Examiner* — Mazda Sabouri
(74) *Attorney, Agent, or Firm* — Fish & Richardson P.C.

(57) ABSTRACT

Techniques are described for cross-device authorization using a wireless network connection. Computing device(s) may broadcast an identification signal indicating that the device is authorized to access a remote service, and is therefore available to provide an authorization token to a receiving device. The receiving device may determine one of the broadcasting device(s) to use for cross-device authorization. The receiving device may send a request, to the determined broadcasting device, for an authorization token to access the remote service. The broadcasting device may receive the request and transmit a message to a server device indicating that an authorization token is to be provided to the receiving device. Alternatively, the authorization token may be sent directly from the broadcasting device to the receiving device (e.g., over the wireless communication network). On receiving the authorization token, the receiving device may use the it to access the remote service.

20 Claims, 8 Drawing Sheets

(56) References Cited

U.S. PATENT DOCUMENTS

| | | | |
|---|---|---|---|
| 2015/0381621 A1* | 12/2015 | Innes | G06F 21/31 |
| | | | 726/7 |
| 2016/0315930 A1* | 10/2016 | Kim | H04L 63/10 |
| 2016/0352751 A1* | 12/2016 | Perrufel | H04L 63/0876 |
| 2017/0149771 A1* | 5/2017 | Vincent | G06Q 10/1095 |
| 2018/0063111 A1* | 3/2018 | Vasudevan | H04L 63/08 |

* cited by examiner

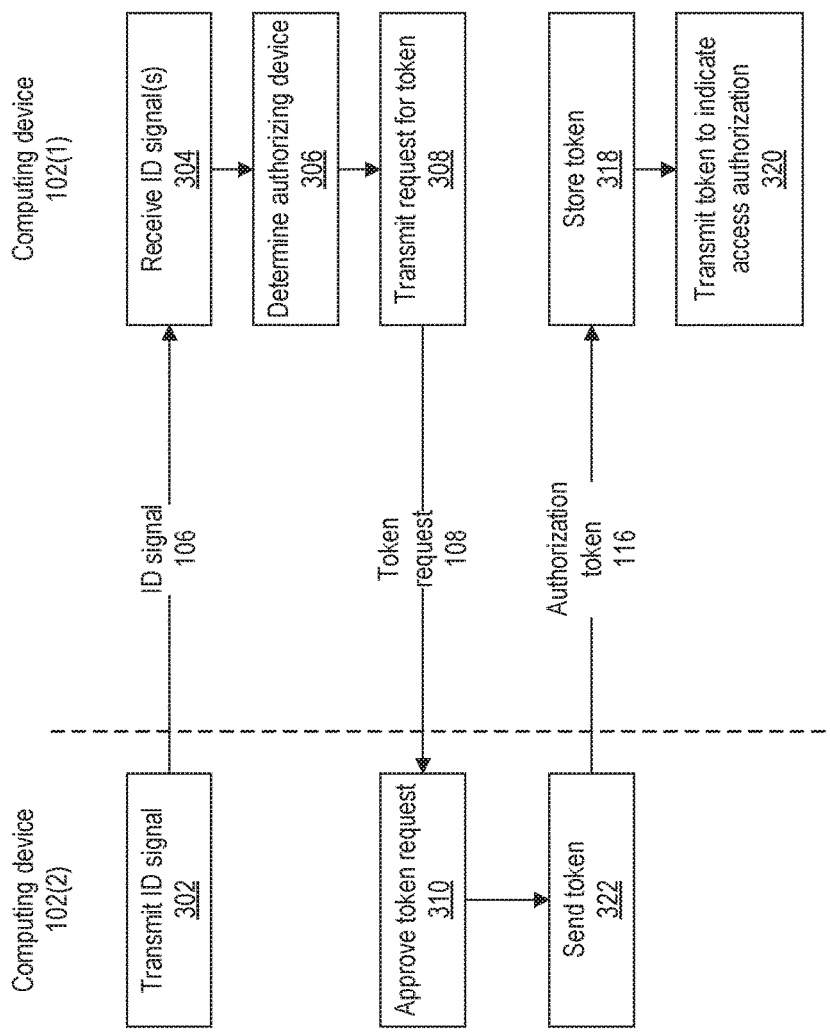

SHORT-RANGE CROSS-DEVICE AUTHORIZATION

BACKGROUND

With the increasing number and variety of Internet-of-Things (IoT) computing devices, such as home entertainment systems, smart appliances, and so forth, a growing number of services are being provided through applications (e.g., apps) that are designed to execute on such computing devices. Such applications may allow users to view information, access account data, communicate with other users, play games, make travel arrangements, shop online, consume audio, image, or video content, share content with others, and so forth. In many instances, applications designed to execute on more traditional computing devices, such as desktop computers, may be difficult to use on IoT devices that have a limited display size or limited interface functionality. Also, given the limited interface capabilities of some IoT devices, it may be difficult for users to enter authentication credentials on such device(s). Accordingly, traditional techniques for user authentication and authorization may be difficult to implement on IoT devices.

SUMMARY

Implementations of the present disclosure are generally directed to determining authorization of a computing device, an application executing on a computing device, and/or a user of a computing device. More specifically, implementations are directed to techniques for cross-device authorization to controlling access to a service, in which an authorization token is provided to a computing device to be used for accessing the service, the token being is associated with another computing device that is authorized to access the service.

In general, innovative aspects of the subject matter described in this specification can be embodied in methods that include actions of: receiving one or more identification (ID) signals transmitted from one or more second computing devices over a wireless network, each of the one or more ID signals identifying a respective second computing device that is authorized to access a remote service; presenting a user interface (UI) that identifies the one or more second computing devices transmitting the one or more ID signals; receiving a selection of a second computing device through the UI and, in response to the selection, transmitting a request for an authorization token, the request transmitted from the first computing device to the second computing device over the wireless network; receiving the authorization token; and transmitting the authorization token to the remote service to indicate that the first computing device is authorized to access the remote service.

Implementations can optionally include one or more of the following features: the authorization token is received from the second computing device over the wireless network; the authorization token is received from a server computing device based on permission granted from the second computing device; the one or more second computing devices include at least one portable computing device; the one or more ID signals are transmitted from the one or more second computing devices through a background process executing on the one or more second computing devices; the remote service determines that the application is authorized to access the remote service by verifying that the authorization token is associated with a user that is authorized to access the remote service; the remote service determines that the application is authorized to access the remote service by verifying that the authorization token is associated with the second computing device that is authorized to access the remote service; the authorization token is arranged according to a version of Open Authorization (OAuth) standard; and/or the wireless network is a wireless personal area network.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. Implementations enable a user and/or application executing on a computing device to readily obtain authorization to access a secure (e.g., remote) service without requiring the user to provide credentials (e.g., login, password, PIN, etc.) that may be difficult to enter on a computing device with limited display and/or interface functionality such as an IoT device. Authorization is determined through use of a token that is provided to the device from a smartphone or other computing device that is also associated with the user and that has been previously authorized to access the service. Moreover, traditional authorization techniques may be particularly prone to errors in the entry of credentials when attempted on a computing device with limited interface capabilities, such as IoT devices. Recovering from such errors may consume processing power, active memory, storage space, and/or network capacity by requiring the user to re-enter incorrect credentials, communicating the re-entered credentials over network(s), analyzing the re-entered credentials to verify the user's identity, and/or performing other operations. Accordingly, by providing a more reliable technique for authorization, implementations consume less computing resources compared to traditional systems.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 3A and 3B depicts flow diagrams of example processes for cross-device authorization, according to implementations of the present disclosure.

DETAILED DESCRIPTION

Implementations of the present disclosure are directed to systems, devices, methods, and computer-readable media for cross-device authorization using a (e.g., short-range) network connection, such as a BlueTooth Low Energy™ (BLE) network or other suitable wireless network. One or more computing devices in an environment may broadcast an identification (ID) signal. The ID signal may indicate that the broadcasting device, and/or an application executing on the broadcasting device, is authorized to access a remote service, and is therefore available to provide an authorization token to a receiving device. The receiving device may receive the various ID signal(s) from (e.g., nearby) broadcasting device(s), and present a list of the broadcasting device(s) in a user interface (UI) of an application executing on the receiving device. The UI may enable a user to select one of the broadcasting device(s), or a particular broadcasting device may be otherwise determined. The receiving device may send a request, to the determined broadcasting device, for an authorization token to access remote service. The broadcasting device may receive the request and transmit a message to a server device indicating that an authorization token is to be provided to the receiving device. Alternatively, the authorization token may be sent from the broadcasting device to the receiving device (e.g., over the wireless communication network used to transmit the ID signal(s)). On receiving the authorization token, the receiving device may use the authorization token to access the remote service.

In some instances, the receiving device is an IoT device or other suitable type of computing device that may have limited user interface functionality, which may make it difficult for a user to enter traditional user credentials (e.g., username, password, PIN, etc.) to obtain authorization to access a remote service. Implementations provide a technique through which authorization can be readily obtained using a cross-device authorization, through which the receiving device connects with a broadcasting device (e.g., smartphone, tablet computer, etc.) that already is authorized to access the service. Through the connection between the receiving device and the broadcasting device, the receiving device obtains an authorization token that can be used by the receiving device to access the service.

Figure 1A:
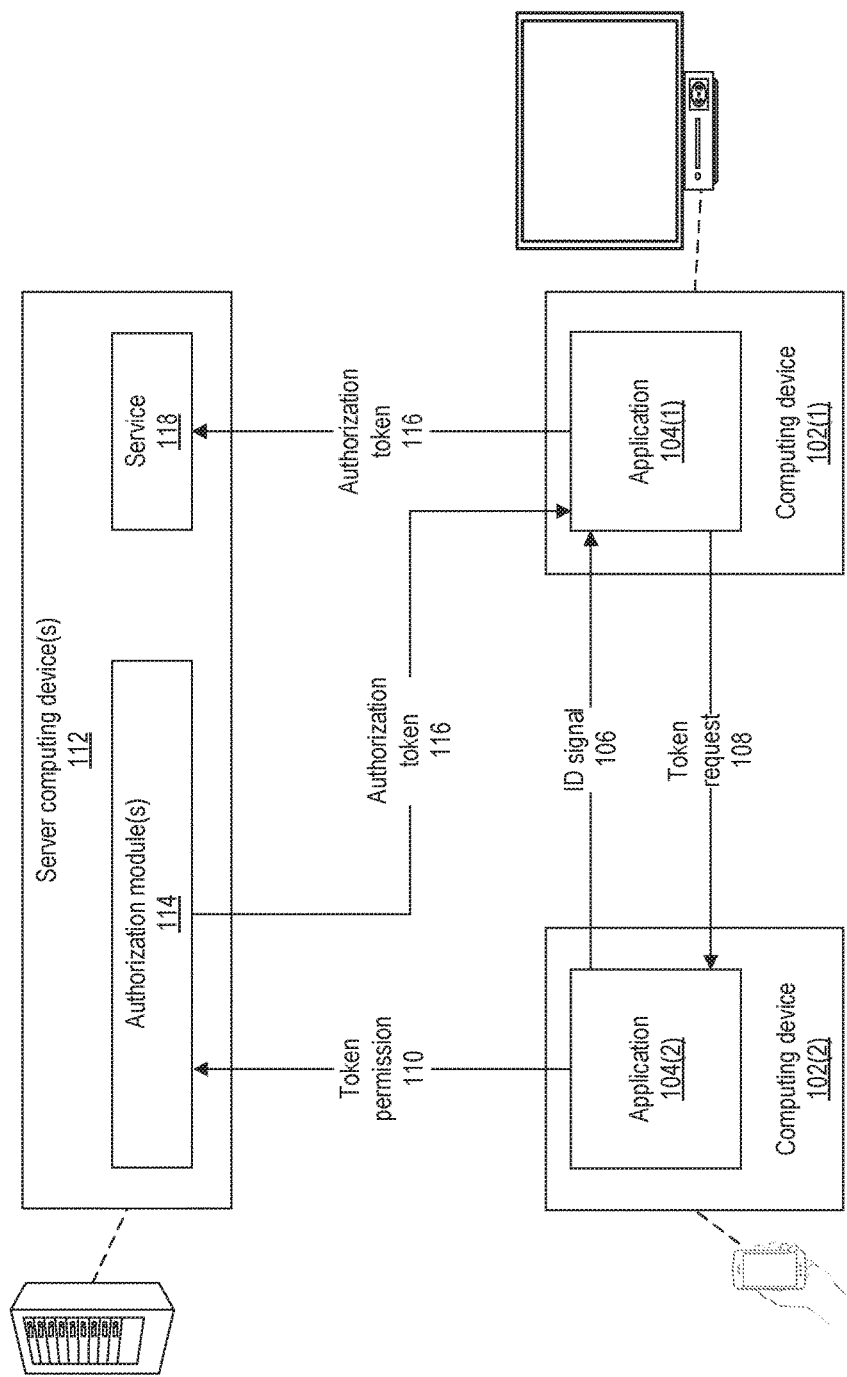
FIGS. 1A and 1B depict example systems for cross-device authorization, according to implementations of the present disclosure.
Figure 1B:
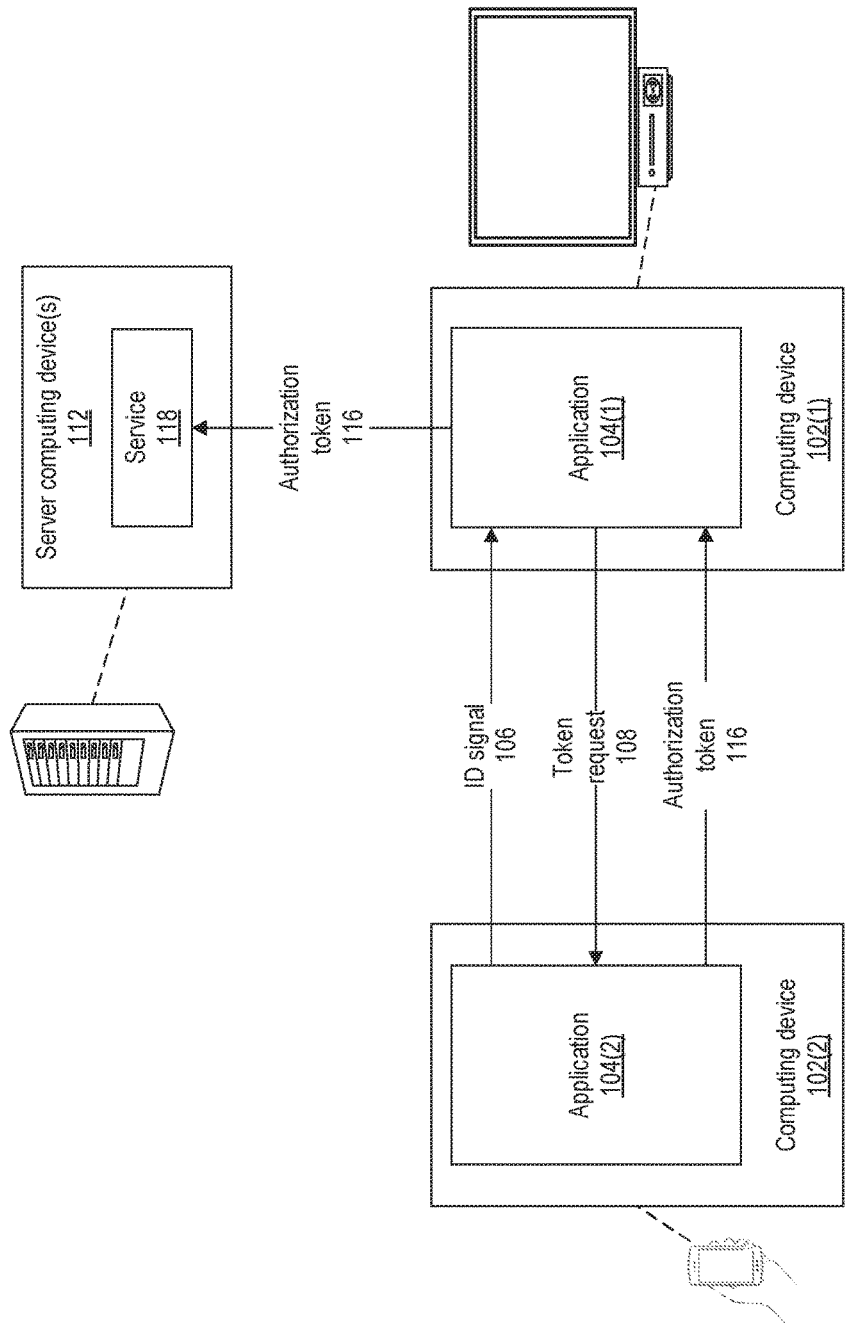

FIGS. 1A and 1B depict example systems for cross-device authorization, according to implementations of the present disclosure. As shown in the example of FIG. 1A, a computing environment may include a computing device 102(1), also referred to as a receiving device, and one or more computing devices 102(2), also referred to as broadcasting device(s). As shown in the example, the device 102(1) may be an IoT device such as a smart appliance, entertainment device (e.g., smart television), game console, or any other suitable type of computing device. In some instances, the device 102(1) may have limited interface capabilities to receive information entered by a user and/or for presenting information to the user. The computing device(s) 102(2) may be any suitable type of computing device. In some instances, the device(s) 102(2) include portable computing device(s), such as a smartphone, a tablet computer, or a wearable computer (e.g., wristwatch, glasses or other headgear, wearable fitness tracking device, etc.).

The device 102(1) may be an IoT device or other type of computing device on which it may be difficult to enter traditional authorization credentials such as username, password, and so forth. For example, the device 102(1) may have no keyboard, or a small virtual keyboard that is difficult to use through a television remote, game controller, or other peripheral device. In some instances, the device 102(1) may include a display that is small and difficult use for display a large amount of text or for presenting the text of credentials as they are entered.

The device 102(1) may execute an application 104(1) and the device(s) 102(2) may each execute an application 104(2). The applications 104(1) and 104(2) may be configured to access a service 118 executing on one or more (e.g., remote) server computing devices 112. The server computing device(s) 112 may include any suitable number and type of computing device. In some instances, the server computing device(s) 112 may be cloud server(s) or other server(s) that provide distributed computing services. The application(s) 104 may include any suitable type of application for interacting with the service 118. In one example, the applications 104(1) and 104(2) may be client-side applications for accessing a financial service 118, to access account information, request payments or other transactions, view transaction history, and/or perform other actions. In another example, the applications 104(1) and 104(2) may be client-side applications for accessing a game service, to play a game, view or modify gaming account information, interact with other users, and/or perform other actions.

For each of the applications 104(1) and 104(2) to access the service 118, the service 118 may determine that the application, the computing device executing the application, and/or a user of the application is authorized to access the service 118. In examples where the service 118 is a financial service, the service 118 may verify that the user is an authorized user to access account data, request transactions, and/or access other features provided by the financial service. In the example scenario described, the computing device 102(1) may not yet be authorized to access the service 118. The computing device(s) 102(2) may already be authorized to access the service 118. The device(s) 102(2), and/or the application(s) 104(2) executing on the device(s) 102(2), may have been granted authorization using any appropriate technique for authorization or authentication. For example, the application 104(2) may prompt the user to enter credentials such as a username, password, PIN, and so forth, and the credential(s) may be communicated to the service 118. Based on the service 118 verifying that the credential(s) are valid credential(s) for an authorized user, the service 118 may authorize the application 104(2) to access secure features of the service 118. As another example, the application 104(2) may collect biometric data from the user, such as a fingerprint scan, retinal scan, pulse, neural activity scan (e.g., brain wave activity), audio recording of the user's voice, image of the user's face, and/or other biometric data. The collected biometric data may be communicated to the service 118, which may compare the collected biometric data to previously obtained biometric data for the user. If the collected biometric data corresponds to the previously obtained biometric data for the user, the service 118 may determine that the user is an authorized user, and the application 104(2) may be authorized to access the service 118.

In some implementations, authorization of the application 104(2) to access the service 118 may include generating an authorization token and transmitting the authorization token to the device 102(2). The token may then be stored on the device 102(2) and used for subsequent access to the service 118, where the token may be provided to access the service 118 in lieu of re-entered credential(s) and/or biometric data. In some implementations, the token may be arranged according to any suitable version of the Open Authorization (OAuth) standard. In some implementations, the token may have a time-to-live (TTL) characteristic such that the token expires after a pre-determined period of time during which the token is not used (e.g., 30 days). After expiration of the token, the user may be required to re-enter credentials and/or re-provide biometric data to obtain a new token and obtain access to the service 118.

In some implementations, after an application 104(2) has gained authorization to the service 118, the application 104(2) may instruct a wireless network transceiver of the computing device 102(2) to begin broadcasting an ID signal 106 that identifies the device 102(2). In some implementations, the ID signal 106 may be broadcasted as a background process even at times when the application 104(2) is not an active (e.g., user-facing and user-interacting) process executing on the device 102(2). The ID signal 106 may identify the device 102(2) using any suitable identification that distinguishes the device 102(2) from other device(s) 102(2) that may also be broadcasting an ID signal 106 in the same environment (e.g., over the same wireless network). For example, the ID signal 106 may include a name and/or identification number of the device 102(2), an address of the device 102(2), such as a media access control (MAC) address or network (e.g., IP) address, and/or other suitable identifier.

On the device 102(1), a user may use the application 104(1) to explore information that is publicly available through the service 118 and that does not require authorization. When the user attempts to access secure features of the service 118 that require authorization, a dialog may be presented in the UI of the application 104(1). The dialog may list the various device(s) 102(2) that are broadcasting an ID signal 106 that is received by a wireless transceiver of the device 102(1). Such device(s) 102(2) may also be described as broadcasting device(s), and the device 102(1) may be described as a receiving device. The broadcast ID signal 106 of each of the device(s) 102(2) may identify the corresponding device 102(2) as available for cross-device authorization.

In some implementations, the ID signal(s) 106 are broadcast over a wireless personal area network, such as a BLE network. Other suitable wireless networking protocols may also be used. The network may be configured for low power consumption and low cost, enabling the ID signal(s) 106 to be broadcast in the background by the device(s) 102(2) without significant power consumption. In some implementations, such as implementations that employ BLE, the power and/or range of the ID signal(s) 106 may be limited such that the device 102(1) detects device(s) 102(2) that are within a threshold distance of the device 102(1). For example, the device 102(1) may detect device(s) 102(2) that are in or near the same room or the same building (e.g., house, apartment, etc.) as the device 102(1). Accordingly, the application 104(1) may present a list of the device(s) 102(2) that are executing the application 104(2) and that are in proximity to the device 102(1).

Through the UI of the application 104(1), the user may select one of the detected device(s) 102(2) listed in the UI. A token request 108 may be sent from the device 102(1) to the selected device 102(2) over the same wireless network that carried the ID signal 106 from the device 102(2). In some implementations, the application 104(1) may then begin polling the service 118 seeking authorization, with the expectation that an authorization token 116 is to be provided for the device 102(1).

On receiving the token request 108, the application 104(2) may present a dialog asking the user to confirm or deny that the device 102(1) is to be granted authorization to access the service 118. In the example of FIG. 1A, if the user confirms authorization, the application 104(2) may transmit a token permission message 110 to one or more authorization modules 114 executing on the server computing device(s) 112. The authorization module(s) 114 may respond to the token permission message 110 by generating a new authorization token 116. The authorization token 116 may be communicated to the application 104(1). Alternatively, the authorization token 116 may be communicated to the application 104(2) which then communicates the authorization token 116 to the application 104(1).

On receiving the authorization token 116, the application 104(1) may transmit the authorization token 116 to the service 118 to request access to the secure portion(s) of the service 118. The service 118 may verify that the token is valid and, in response, allow access to the application 104(1). In some implementations, the authorization token 116 may be an OAuth token such as described above. In some implementations, the authorization token 116 may be associated with the computing device 102(2), the application 104(2), and/or an authorized user, and the service 118 may validate the token 116 by verifying that the token 116 is associated with a device 102(2), an application 104(2), and/or a user that is already authorized to access the service 118. In some instances, the token 116 may include information that identifies the authorized device 102(2), application 104(2) instance, and/or user. For example, the token 116 may include a telephone number or other identifier of the device 102(2), and the service 118 may validate the token 116 may verify that the included telephone number or other identifier is associated with an authorized device 102(2).

On receiving the authorization token 116 from the application 104(1), the service 118 may dereference the token 116 to identify the user, device 102(2), and/or application 104(2) instance that is authorized to access the service 118. In some instances, the service 118 may determine access levels, permissions, or other particular details governing the access to be granted, based on the particular user, device 102(2), and/or application 104(2) instance that is authorized to access the service 118. For example, the application 104(1) may be provided with the same level of access and/or permissions that have been previously determined for the device 102(2), the application 104(2) instance, and/or user.

In some implementations, instead of sending the token request 108 to the application 104(2), the application 104(1) may send a token request 108 to the service 118 and/or the authorization module(s) 114. The token request 108 may identify the particular device 102(2) that was selected for cross-device authorization through the UI of the application 104(1). The service 118 and/or authorization module(s) 114 may send a (e.g., push) notification to the application 104(2) in response to receiving the token request 108, the notification indicating that the device 102(1) is requesting authorization and referencing the device 102(2). The user may confirm or deny the authorization through the application 104(2). If the user confirms, a token permission message 110 may be sent to the authorization module(s) 114, which may generate and send the authorization token 116 to the application 104(1) in response to receiving the token permission message 110. In some implementations, the user may be required to re-authenticate themselves on the device 102(2), by providing credential(s), biometric data, and/or other information to establish their identity. In some instances, if the user has previously authenticated themselves, and the device 102(2) accordingly stores its own authorization token (e.g., an OAuth token), the user may not be required to re-authenticate.

FIG. 1B illustrates an example in which the authorization token 116 may be provided from the device 102(2) to the device 102(1), without employing the server computing device(s) 112 as intermediary. In such examples, on receiving the token request 108 from the application 104(1), the application 104(2) may respond by transmitting the authorization token 116 to the application 104(1) over the wireless network. For example, the token 116 may be an OAuth token that was previously transmitted to, and stored on, the device 102(2) following a successful authentication of the user through credential(s), biometric data, and/or other techniques. Accordingly, the device 102(2) may share its token 116 with the device 102(1) to authorize the device 102(1) to access the service 118. In some implementations, communications between the device 102(2) and the device 102(1) (e.g., to transmit the ID the token request 108 and/or token 116) may be performed over a connection that is established between the devices following a handshake. For example, a BLE connection may be established and used to transfer information between the devices.

In some examples, as in FIG. 1A, the authorization module(s) 114 may execute on different server computing device(s) 112 than the service 118. For example, the authorization module(s) 114 may execute on authorization server(s) that provide an authorization service, and the service 118 may execute elsewhere while leveraging the authorization service to determine authorized access to the service 118. In some implementations, the authorization token 116 may be communicated to the device 102(1) from server(s) that are associated with the particular type of device 102(1). For example, the device 102(1) may be a television, and the authorization token 116 may be communicated to the television from server(s) that provide a smart television service. In such instances, the token 116 may be generated by the authorization module(s) 114 and communicated from the authorization module(s) 114 to the smart television service, which then provide the token 116 for download to the television.

The authorization token 116 may be stored on the device 102(1) and used for subsequent accesses to the service 118, without requiring the cross-device authorization process to be repeated. As described above, the token 116 may have a TTL such that cross-device authorization may be required at a later time if the token is not used for a threshold period of time (e.g., 30 days). In some implementations, the TTL of a token 116 may be customized such that different types of the device 102(1) are provided with token(s) that exhibit a different TTL. In some instances, the token 116 may never time out.

In some implementations, the token 116 may be device-specific and scoped to the particular device 102(1), such that the token 116 may only be used to provide access to the particular device 102(1). Alternatively, the token 116 may be generic and scope, and may be shared among multiple devices which may use the same token 116 to request access.

In some implementations, the device 102(1) may employ another device, such as a personal assistant (PA) device, to request authorization through cross-device authorization. For example, the user may send a voice command to the PA device, instructing the PA device to authenticate the device 102(1) (e.g., "authenticate my television to access the service X"). The PA device may then detect the various device(s) 102(2) that are transmitting an ID signal 106 in the vicinity, and select one automatically. Alternatively, the PA device may ask the user (e.g., through speech output) to select one of the device(s) 102(2) that has been detected. The PA device may then operate as described above to request the token 108 to be transmitted to the device 102(1). In this way, the PA device may act as a surrogate interface for the device 102(1), such as in situations where the device 102(1) lacks a visual display and/or other I/O capabilities. In some implementations, the authorization token 116 may be transmitted initially to the PA device, which may then transmit the token to the device 102(1) over the wireless network (e.g., BLE network) that connects the PA device, the device 102(1), and the device 102(2).

In some implementations, the process may be initiated from the device 102(2) instead of being initiated from the device 102(1). For example, one or more device(s) 102(1) may send token requests 108 to the device 102(2) to request cross-device authorization. The application 104(2) may present the list of requesting device(s) 102(1) that have been detected in the vicinity, and the user may use the UI of the application 104(2) to indicate which device(s) 102(1) are to be authorized to access the service 118. The selected device(s) 102(1) may then be sent token(s) 116 as described herein.

Figure 2A:
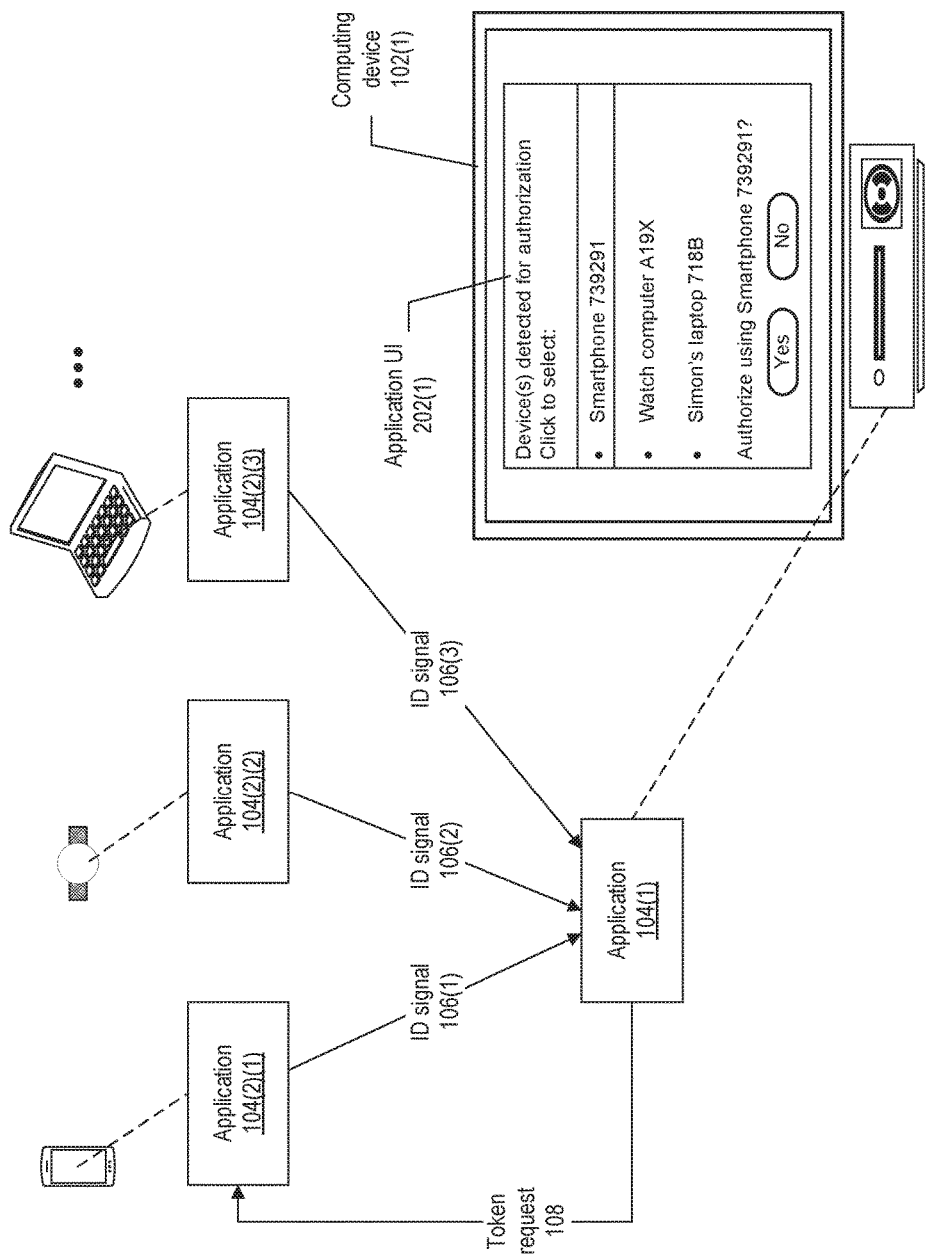
FIGS. 2A and 2B depicts example user interfaces for cross-device authorization, according to implementations of the present disclosure.
Figure 2B:
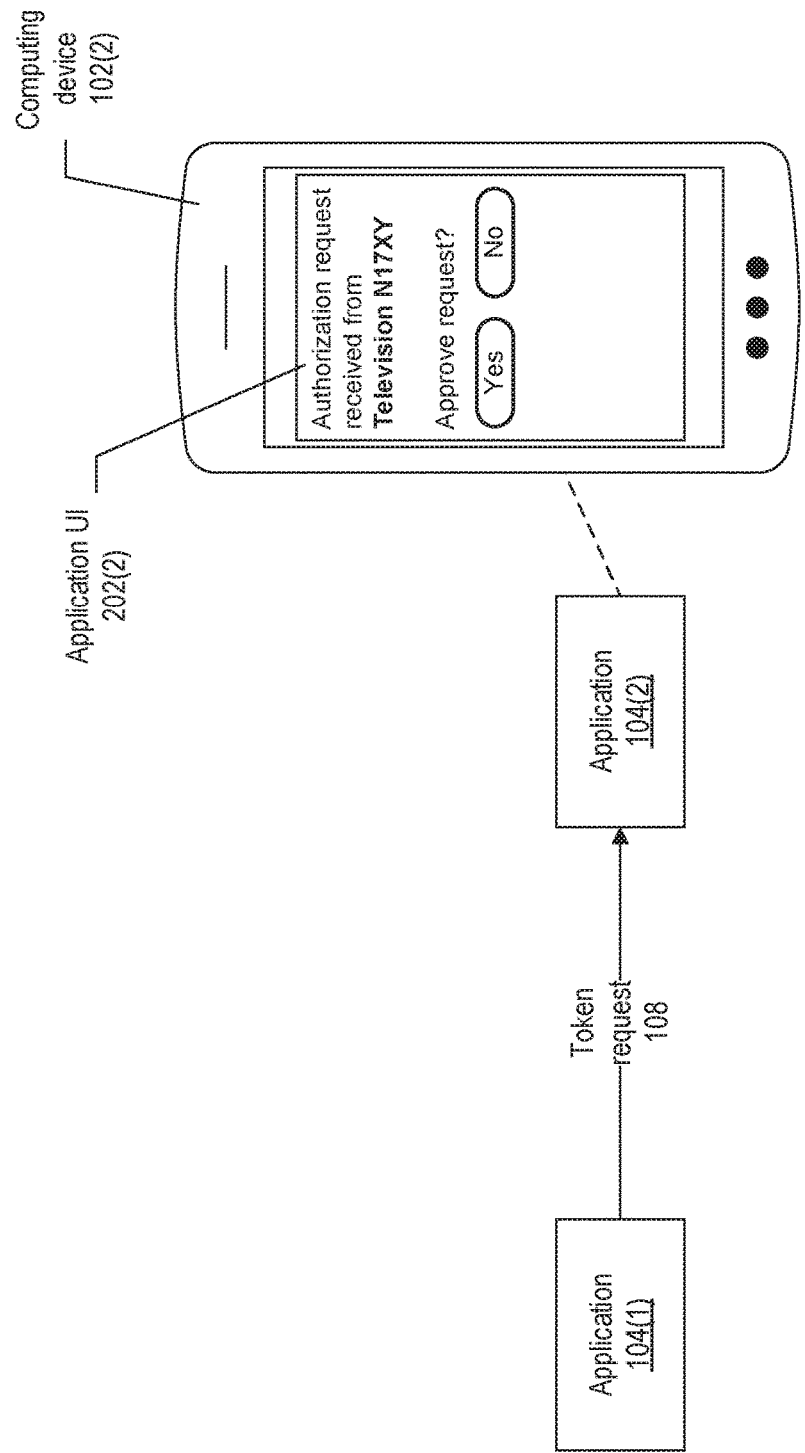

FIGS. 2A and 2B depicts example UIs 202(1) and 202(2) for cross-device authorization, according to implementations of the present disclosure. FIG. 2A depicts an example UI 202(1) that may be presented on the requesting device 102(1). As described above, the wireless transceiver of the device 102(1) may detect the various ID signal(s) 106 broadcast by device(s) 102(2) in the vicinity. The broadcasting device(s) 102(2) may include different types of device(s). For example, as shown in FIG. 2A, a user may own a smartphone, a wearable (e.g., watch) computer, and a laptop computer, each device 102(2) may execute an instance of the application 104(2), and each device 102(2) may have been previously authorized to access the service 118. On receiving the ID signal(s) 106, the application 104(1) may present, in the UI 202(1), a list of the detected device(s) 102(2). The user may peruse the list and select one of the device(s) 102(2) to use for cross-device authorization. In response to the user's selection and verification of a device 102(2) to be used, the application 104(1) may send the token request 108 to request the authorization token 116 as described herein.

FIG. 2B depicts an example UI 202(2) that may be presented on the selected broadcasting device 102(2). As shown in the example, on receiving the token request 108 from the application 104(1), the application 104(2) may present, in the UI 202(2), a dialog prompting the user to confirm or deny the requested authorization from the device 102(1). If the user approves the request, the authorization token 116 may be provided to the device 102(1), either through the authorization module(s) 114 (e.g., as in FIG. 1A) or from the application 104(2) (e.g., as in FIG. 1B).

Figure 3A:
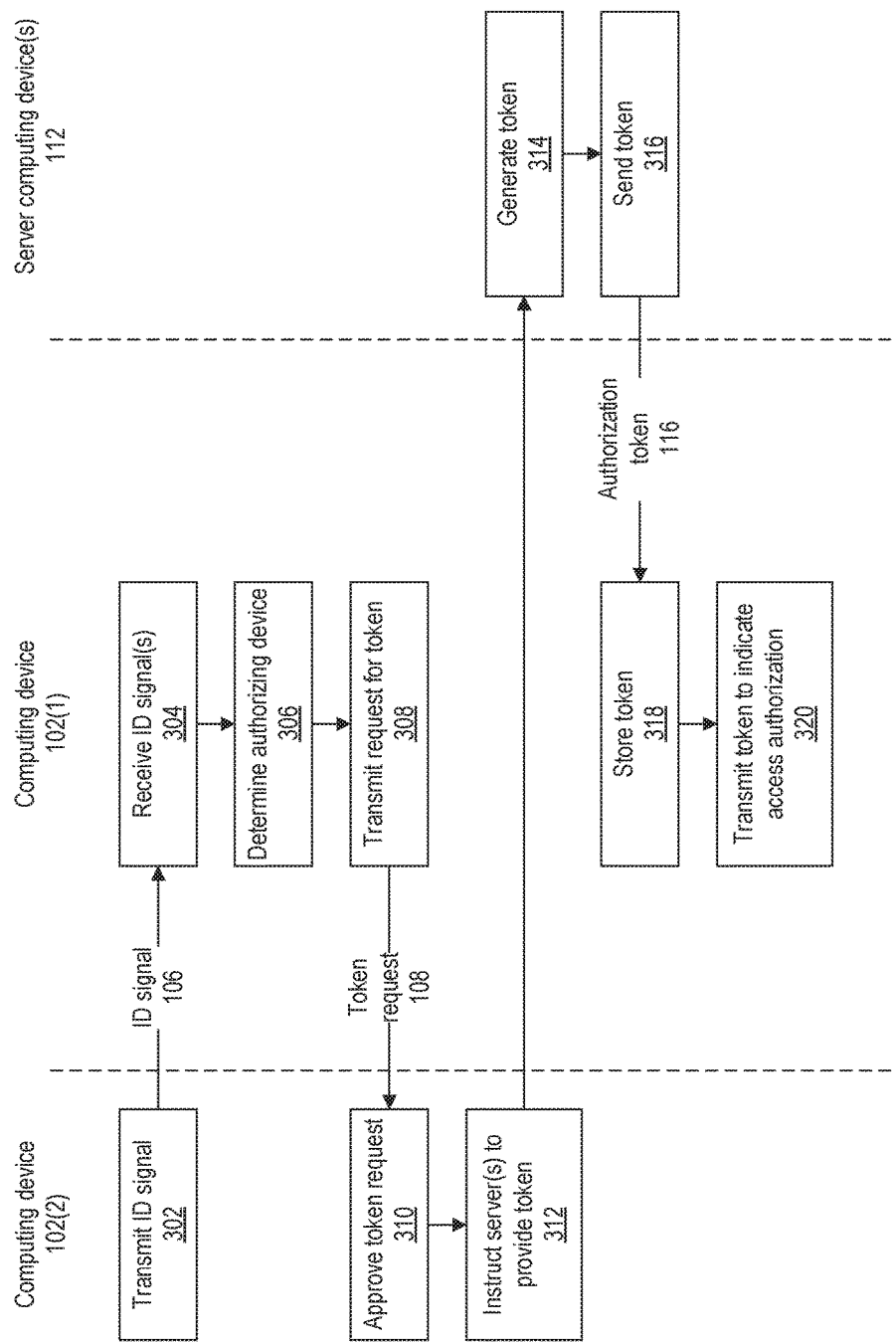

FIGS. 3A and 3B depicts flow diagrams of example processes for cross-device authorization, according to implementations of the present disclosure. Operations of the processes may be performed by one or more of the application 104(1), the application 104(2), the authorization module(s) 114, the service 118, the application UI 202(1), the application UI 202(2), and/or other software module(s) executing on the computing device 102(1), the computing device 102(2), the server computing device(s) 112, or elsewhere.

FIG. 3A depicts an example process such as that described with reference to FIG. 1A. As described above, the various device(s) 102(2) may transmit (302) ID signal(s) 106 over a BLE network or other suitable wireless network. The device 102(1) may receive (304) the ID signal(s) 106. A particular authorizing device 102(2) may be determined (306). As described above, the determination may be through a user selection of a particular device 102(2) in the UI of the application 104(1). Alternatively, the application 104(1) may select a particular device 102(2) automatically without prompting the user for selection. In some instances, if only one device 102(2) is detected in vicinity to the device 102(1), that device 102(2) may be automatically selected for use in cross-device authorization without prompting the user to make a selection.

The token request 108 may be transmitted (308) (e.g., over the wireless network) from the device 102(1) to the particular device 102(2) that has been determined for cross-device authorization. On receiving the token request 108, the device 102(2) may approve (310) or deny the token request. In some implementations, the application 104(2) may present a dialog that enables the user to approve to deny the request, as described above. If the request is approved, the device 102(2) may send (312) a token permission message 110 to instruct the server device(s) 112 to generate and/or provide the token 116.

On receiving the token permission message 110, the authorization module(s) 114 may generate (314) the token 116. The token 116 may be sent (316) to the device 102(1). In some implementations, the authorization module(s) 114 may verify that the token permission message 110 is sent by an authorized device 102(2), application 104(2) instance, and/or user before generating and sending the token 116 to the device 102(1).

On receiving the token 116, the device 102(1) may store (318) the token 116. The device 102(1) may transmit (320) the token 116 to indicate the authorization of the device 102(1) and/or application 104(1) to access the service 118.

FIG. 3B depicts an example process such as that described with reference to FIG. 1B. As described above, the various device(s) 102(2) may transmit (302) ID signal(s) 106 over a BLE network or other suitable wireless network. The device 102(1) may receive (304) the ID signal(s) 106. A particular authorizing device 102(2) may be determined (306) as described above. The token request 108 may be transmitted (308) (e.g., over the wireless network) from the device 102(1) to the particular device 102(2) that has been determined for cross-device authorization. On receiving the token request 108, the device 102(2) may approve (310) or deny the token request as described above. If the request is approved, the device 102(2) may send (322) an authorization token 116 to the device 102(1). For example, the token 116 may be a copy of the authorization token 116 that has previously been provided to the device 102(2) to enable the application 104(2) to access the service 118. On receiving the token 116, the device 102(1) may store (318) the token 116. The device 102(1) may transmit (320) the token 116 to indicate the authorization of the device 102(1) and/or application 104(1) to access the service 118.

Figure 4:
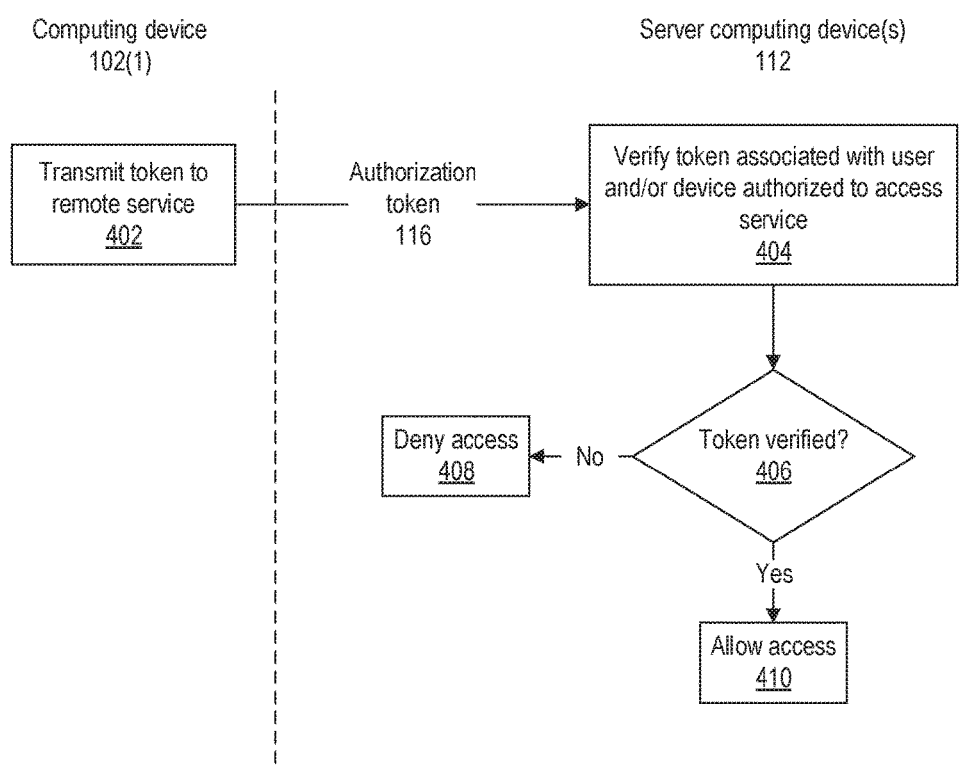
FIG. 4 depicts a flow diagram of an example process for accessing a service using a token provided through cross-device authorization, according to implementations of the present disclosure.

FIG. 4 depicts a flow diagram of an example process for accessing a service using a token provided through cross-device authorization, according to implementations of the present disclosure. Operations of the processes may be performed by one or more of the application 104(1), the application 104(2), the authorization module(s) 114, the service 118, the application UI 202(1), the application UI 202(2), and/or other software module(s) executing on the computing device 102(1), the computing device 102(2), the server computing device(s) 112, or elsewhere.

The device 102(1) may retrieve its token 116 from storage and transmit (402) the token 116 (e.g., with an access request) to the service 118. On receiving the access request that includes the token 116, the service 118 may verify (404) that the token 116 is associated with a user, an application 104(2) instance, and/or a device 102(2) that is authorized to access the service 118. As described above, this may include dereferencing the identification information (e.g., identifying the device 102(2), application 104(2) instance, and/or user) that is included in the token 116.

If the token 116 is verified (406), access to the service 118 may be allowed (410) for the application 104(1) executing on the device 102(1). If the token 116 is not verified (406) and/or determined to be invalid in some way, access to the service 118 may be denied (408).

Figure 5:
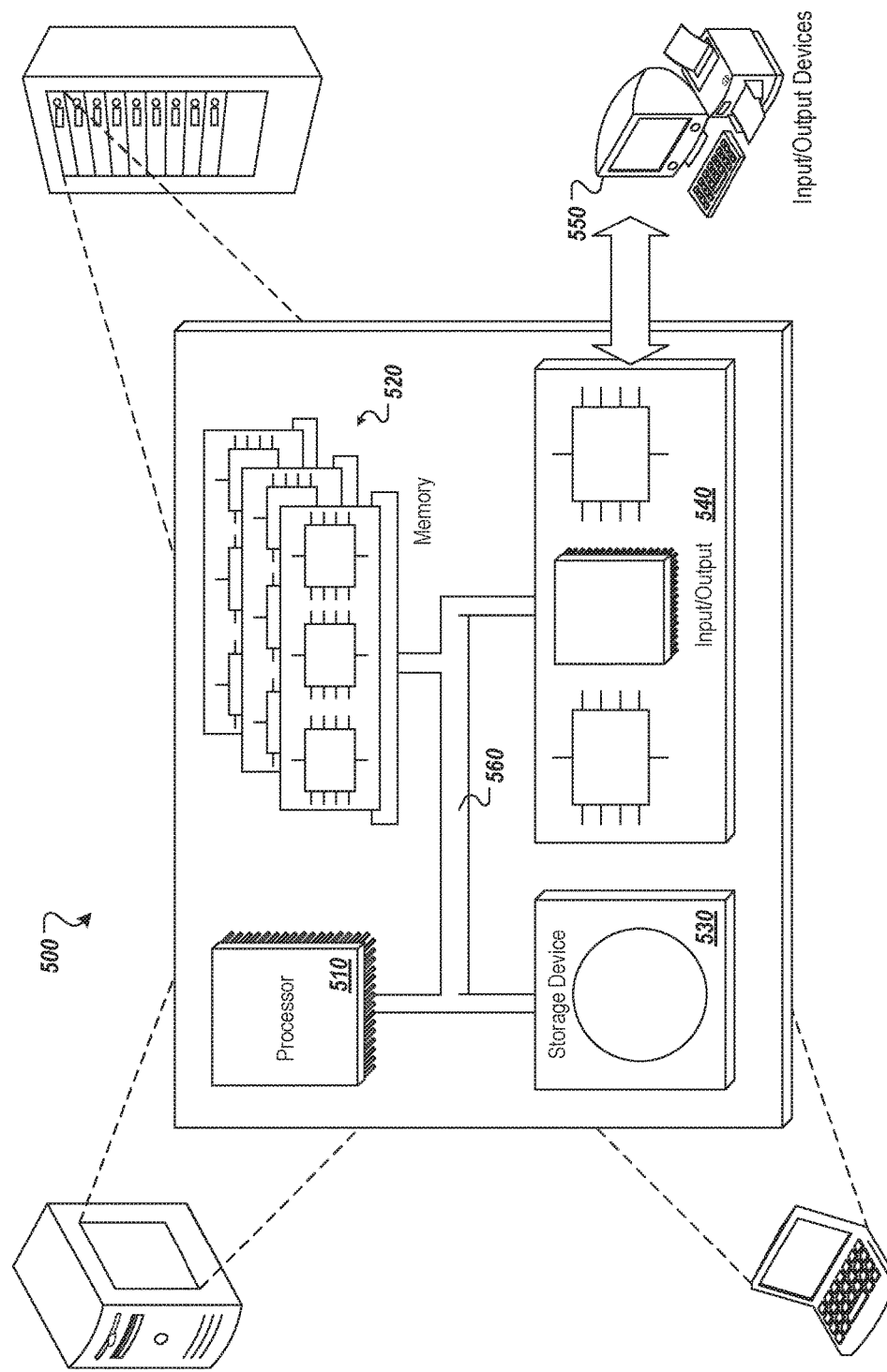
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the computing device(s) 102, the server computing device(s) 112, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by a first computing device, the method comprising:
    receiving, by the first computing device, one or more identification (ID) signals transmitted from one or more second computing devices over a wireless network, each of the one or more ID signals identifying a respective second computing device that is authorized to access a remote service;
    presenting, by the first computing device, a user interface (UI) that identifies the one or more second computing devices transmitting the one or more ID signals;
    receiving, by the first computing device, a selection of a second computing device through the UI and, in response to the selection, transmitting a request for an authorization token, the request transmitted from the first computing device to the second computing device over the wireless network;

receiving, by the first computing device, the authorization token that is sent to the first computing device in response to a confirmation, provided through a second UI executing on the second computing device, that the first computing device is to be granted authorization to access the remote service; and transmitting, by the first computing device, the authorization token to the remote service to indicate that the first computing device is authorized to access the remote service.

2. The method of claim 1, wherein the authorization token is received from the second computing device over the wireless network.

3. The method of claim 1, wherein the authorization token is received from a server computing device based on the confirmation provided from the second computing device.

4. The method of claim 1, wherein the one or more second computing devices include at least one portable computing device.

5. The method of claim 1, wherein the one or more ID signals are transmitted from the one or more second computing devices through a background process executing on the one or more second computing devices.

6. The method of claim 1, wherein the remote service determines that the application is authorized to access the remote service by verifying that the authorization token is associated with a user that is authorized to access the remote service.

7. The method of claim 1, wherein the remote service determines that the application is authorized to access the remote service by verifying that the authorization token is associated with the second computing device that is authorized to access the remote service.

8. The method of claim 1, wherein the authorization token is arranged according to a version of Open Authorization (OAuth) standard.

9. The method of claim 1, wherein the wireless network is a wireless personal area network.

10. A system, comprising:
at least one processor of a first computing device; and
a memory communicatively coupled to the at least one processor, the memory storing instructions which, when executed by the at least one processor, cause the at least one processor to perform operations comprising:
  receiving, by the first computing device, one or more identification (ID) signals transmitted from one or more second computing devices over a wireless network, each of the one or more ID signals identifying a respective second computing device that is authorized to access a remote service;
  presenting, by the first computing device, a user interface (UI) that identifies the one or more second computing devices transmitting the one or more ID signals;
  receiving, by the first computing device, a selection of a second computing device through the UI and, in response to the selection, transmitting a request for an authorization token, the request transmitted from the first computing device to the second computing device over the wireless network;
  receiving, by the first computing device, the authorization token that is sent to the first computing device in response to a confirmation, provided through a second UI executing on the second computing device, that the first computing device is to be granted authorization to access the remote service; and
  transmitting, by the first computing device, the authorization token to the remote service to indicate that the first computing device is authorized to access the remote service.

11. The system of claim 10, wherein the authorization token is received from the second computing device over the wireless network.

12. The system of claim 10, wherein the authorization token is received from a server computing device based on the confirmation provided from the second computing device.

13. The system of claim 10, wherein the one or more second computing devices include at least one portable computing device.

14. The system of claim 10, wherein the one or more ID signals are transmitted from the one or more second computing devices through a background process executing on the one or more second computing devices.

15. The system of claim 10, wherein the remote service determines that the application is authorized to access the remote service by verifying that the authorization token is associated with a user that is authorized to access the remote service.

16. The system of claim 10, wherein the remote service determines that the application is authorized to access the remote service by verifying that the authorization token is associated with the second computing device that is authorized to access the remote service.

17. The system of claim 10, wherein the authorization token is arranged according to a version of Open Authorization (OAuth) standard.

18. The system of claim 10, wherein the wireless network is a wireless personal area network.

19. One or more non-transitory computer-readable media storing instructions which, when executed by at least one processor of a first computing device, cause the at least one processor to perform operations comprising:
receiving, by the first computing device, one or more identification (ID) signals transmitted from one or more second computing devices over a wireless network, each of the one or more ID signals identifying a respective second computing device that is authorized to access a remote service;
presenting, by the first computing device, a user interface (UI) that identifies the one or more second computing devices transmitting the one or more ID signals;
receiving, by the first computing device, a selection of a second computing device through the UI and, in response to the selection, transmitting a request for an authorization token, the request transmitted from the first computing device to the second computing device over the wireless network;
receiving, by the first computing device, the authorization token that is sent to the first computing device in response to a confirmation, provided through a second UI executing on the second computing device, that the first computing device is to be granted authorization to access the remote service; and
transmitting, by the first computing device, the authorization token to the remote service to indicate that the first computing device is authorized to access the remote service.

20. The one or more non-transitory computer-readable media of claim 19, wherein the authorization token is received from the second computing device over the wireless network.

* * * * *

UNITED STATES PATENT AND TRADEMARK OFFICE
CERTIFICATE OF CORRECTION

PATENT NO. : 10,117,097 B1  
APPLICATION NO. : 15/450572  
DATED : October 30, 2018  
INVENTOR(S) : Brandon Scott Kotara et al.

Page 1 of 1

It is certified that error appears in the above-identified patent and that said Letters Patent is hereby corrected as shown below:

Abstract:
Column 2, Line 17, after "use" delete "the".

Signed and Sealed this
Thirtieth Day of April, 2019

Andrei Iancu
*Director of the United States Patent and Trademark Office*